(12) United States Patent
Ju et al.

(10) Patent No.: US 12,313,473 B2
(45) Date of Patent: May 27, 2025

(54) APPARATUS AND METHOD FOR MEASURING BODY TEMPERATURE BY RECOGNIZING THE FACE

(71) Applicant: INTFLOW INC., Gwangju (KR)

(72) Inventors: So Heun Ju, Gwangju (KR); Kwang Myung Jeon, Gwangju (KR)

(73) Assignee: INTFLOW INC., Gwangju (KR)

( * ) Notice: Subject to any disclaimer, the term of this patent is extended or adjusted under 35 U.S.C. 154(b) by 724 days.

(21) Appl. No.: 17/688,433

(22) Filed: Mar. 7, 2022

(65) Prior Publication Data
US 2022/0283043 A1    Sep. 8, 2022

(30) Foreign Application Priority Data

Mar. 8, 2021 (KR) .......................... 10-2021-0029947

(51) Int. Cl.
*H04N 23/611* (2023.01)
*G01J 5/00* (2022.01)
*G01K 13/20* (2021.01)

(52) U.S. Cl.
CPC .......... *G01K 13/223* (2021.01); *G01J 5/0025* (2013.01); *H04N 23/611* (2023.01); *G01J 2005/0077* (2013.01)

(58) Field of Classification Search
CPC ................ G01K 13/223; G01J 5/0025; G01J 2005/0077; H04N 23/611; A61B 5/01; A61B 5/1176; A61B 5/742; A61B 5/746; A61B 2560/0252; A61B 2562/0271; G06V 40/16
USPC ..................................................... 382/115
See application file for complete search history.

(56) References Cited

U.S. PATENT DOCUMENTS

2020/0352452 A1* 11/2020 Kakileti .................... G06T 7/11

* cited by examiner

*Primary Examiner* — Stephen P Coleman
(74) *Attorney, Agent, or Firm* — CANTOR COLBURN LLP

(57) ABSTRACT

A face recognition body temperature measuring apparatus includes a communication module receiving a video image and a thermal image obtained by simultaneously imaging at least one target object from a camera module, a memory storing a body temperature measurement program for measuring a body temperature by using the video image and the thermal image, and a processor executing the program.

17 Claims, 5 Drawing Sheets

APPARATUS AND METHOD FOR MEASURING BODY TEMPERATURE BY RECOGNIZING THE FACE

BACKGROUND

1. Technical Field

The present disclosure relates to face recognition body temperature measuring apparatus and method, and more particularly, to a face recognition body temperature measuring apparatus and method for measuring a body temperature of a person in a camera image in consideration of correction according to various variables.

2. Related Art

In recent years, thermal imaging cameras have been used to monitor fever of entrants in entrances and exits of buildings. The thermal imaging cameras detect infrared rays and visualize the infrared rays in different colors depending on temperatures. In general, a human face is not covered unlike other body parts, and thus, a remote body temperature measuring method of measuring a temperature of a face by capturing an image of the face with a thermal imaging camera is commonly used.

A known remote body temperature measuring method includes a method using a thermal imaging camera and a black box. In this method, the black box is set as an estimated expected temperature value, and when a gray pixel value of the black box is within a gray pixel value error of a target object, it is determined that the target object has a normal temperature. According to this method, an object having a temperature set in the black box may be monitored, but there is a problem in that temperatures of objects having different temperatures cannot be estimated. In addition

SUMMARY

The present disclosure provides face recognition body temperature measuring apparatus and method for measuring a body temperature of a person in a camera image in consideration of correction according to various variables.

However, technical problems to be solved by the present embodiment are not limited to the technical problems described above, and there may be other technical problems.

According to one aspect of the present disclosure, a face recognition body temperature measuring apparatus includes a communication module configured to receive a video image and a thermal image obtained by simultaneously imaging at least one target object from a camera module, a memory configured to store a body temperature measurement program for measuring a body temperature by using the video image and the thermal image, and a processor configured to execute the body temperature measurement program stored in the memory. The processor sets a face area by detecting a face of the target object in the video image, sets, in the thermal image, a temperature measurement area corresponding to the face area in the video image, calculates a greatest infrared intensity value which is a greatest value of infrared intensity values in the temperature measurement area, calculates an infrared intensity value of a temperature measurement target by adding, to the greatest infrared intensity value, a first correction value calculated based on infrared intensity values of a specific object that varies according to a measurement distance, a second correction value calculated based on infrared intensity values of a specific object that varies according to an external temperature, and a third correction value calculated based on infrared intensity values of a specific object that varies according to a change rate of the external temperature, and calculates a body temperature of the at least target object by using a difference between the infrared intensity value of the temperature measurement target and an infrared reference value preset by the face recognition body temperature measuring apparatus.

According to another aspect of the present disclosure, a face recognition body temperature measuring method includes setting a face area by detecting a face in a video image among the video image and a thermal image obtained by simultaneously imaging at least one target object, setting, in the thermal image, a temperature measurement area corresponding to the face area in the video image, calculating a greatest infrared intensity value which is a greatest value of infrared intensity values in the temperature measurement area, calculating an infrared intensity value of a temperature measurement target by adding, to the greatest infrared intensity value, a first correction value calculated based on infrared intensity values of a specific object that varies according to a measurement distance, a second correction value calculated based on infrared intensity values of a specific object that varies according to an external temperature, and a third correction value calculated based on infrared intensity values of a specific object that varies according to a change rate of the external temperature, and calculating a body temperature of the at least target object by using a difference between the infrared intensity value of the temperature measurement target and an infrared reference value preset by the face recognition body temperature measuring apparatus.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Figure 1:
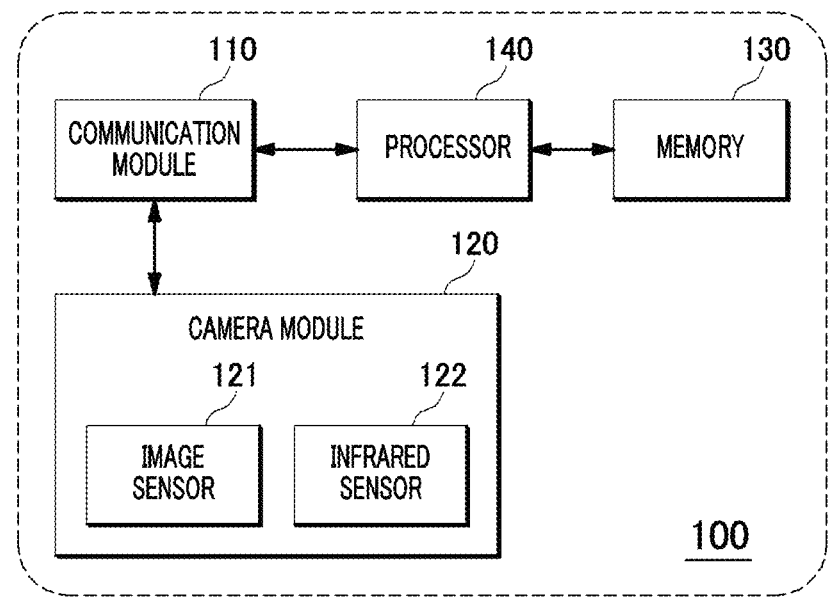
FIG. 1 is a block diagram illustrating a configuration of a face recognition body temperature measuring apparatus according to an embodiment of the present disclosure.

Hereinafter, the present disclosure will be described in detail with reference to the accompanying drawings. However, the present disclosure may be implemented in various different forms and is not limited to the embodiments described herein. In addition, the accompanying drawings are only for easy understanding of the embodiments disclosed in the present specification, and the technical ideas disclosed in the present specification are not limited by the accompanying drawings. In order to clearly describe the present disclosure, parts irrelevant to the descriptions in the drawings are omitted, and sizes, forms, and shapes of respective components illustrated in the drawings may be variously modified. The same and similar reference numerals are attached to the same and similar components throughout the specification.

Suffixes "module" and "portion/unit" for components used in the following description are given or mixed in consideration of only ease of writing the specification, and do not have distinct meanings or roles by themselves. In addition, in describing the embodiments disclosed in the present specification, when it is determined that detailed descriptions of related known technologies may obscure the gist of the embodiments disclosed in the present specification, detailed descriptions thereof are omitted.

Throughout the specification, when it is described that a portion is "connected (coupled, contacted, or combined)" to another portion, this means not only that the portion is "directly connected (coupled, contacted, or combined) to another portion" but also that the portion is "indirectly connected (coupled, contacted, or combined) to another portion with a member therebetween. In addition, when it is described that a portion "includes (comprises or is provided with)" a component, this means that other components may be further "included (comprised or provided)" without excluding other components unless otherwise stated.

Terms indicating an ordinal numbers such as first, second, and so on used herein are used only for the purpose of distinguishing one component from another component and do not limit the order or relationship of the components. For example, a first component of the present disclosure may be referred to as a second component, and similarly, a second component may also be referred to as a first component.

FIG. 1 is a block diagram illustrating a configuration of a face recognition body temperature measuring apparatus (hereinafter, referred to as a "face recognition body temperature measuring apparatus 100") according to an embodiment of the present disclosure. FIGS. 2 to 5 are views illustrating examples of body temperature measurement using the face recognition body temperature measuring apparatus 100. Hereinafter, the face recognition body temperature measuring apparatus 100 will be described in detail with reference to FIGS. 1 to 5.

Referring to FIG. 1, the face recognition body temperature measuring apparatus 100 includes a communication module 110, a processor 140, a camera module 120, and a memory 130. The face recognition body temperature measuring apparatus 100 may be implemented by a computer or a portable terminal that may access a server or another terminal through a network. Here, the computer may include, for example, a notebook computer, a desktop computer, and a laptop installed with a WEB browser), and the portable terminal is, for example, a wireless communication device with portability and mobility and may include all types of handheld-based wireless communication devices such as international mobile telecommunication (IMT)-2000, code division multiple access (CDMA)-2000, W-CDMA, wireless broadband Internet (Wibro), a long term evolution (LTE) communication-based terminal, a smartphone, and a tablet personal computer (PC). In addition, the network may include a wired network such as a local area network (LAN), a wide area network (WAN), or a value-added network (VAN), and all types of wireless networks such as a mobile radio communication network, or a satellite communication network and a satellite network.

The communication module 110 receives a video image and a thermal image from the camera module 120. The video image and the thermal image may be obtained by simultaneously imaging the same space. The video image and the thermal image may be obtained by simultaneously imaging a target object. The target object may be a human. A plurality of faces for a plurality of target objects may be included in the video image and the thermal image. Resolution Nij of the video image may be represented by Equation (1) below, and resolution Qij of the thermal image may be represented by Equation (2) below. The communication module 110 may include hardware and software necessary for transmitting and receiving signals such as control signals or data signals through wired/wireless connection to other network devices.

$$M_x \times M_y = Nij \qquad \text{Equation (1)}$$

$$P_x \times P_y = Qij \qquad \text{Equation (2)}$$

In Equation (1) and Equation (2), x and y respective indicate an x-axis coordinate value and a y-axis coordinate value.

The camera module 120 acquires an image by capturing an image and transmits the acquired image to the communication module 110. Images of a plurality of persons may be included in the corresponding image. The camera module 120 includes an image sensor 121 and an infrared sensor 122. Specifically, the camera module 120 may acquire the above-described video image through the image sensor 121 and acquire the above-described thermal image by using the infrared sensor 122. Although the drawing illustrates that the camera module 120 is included in the face recognition body temperature measuring apparatus 100, the camera module 120 may also be implemented by a separate device. In one example, the camera module 120 may include a camera device installed in a direction facing a specific space to continuously image a corresponding space to obtain an image.

The memory 130 stores a body temperature measurement program executed by the processor 140. In addition, the memory 130 stores at least one of data input to the communication module 110, data necessary for a function performed by the processor 140, and data generated according to execution of the processor 140. The memory 130 includes a nonvolatile storage device that continuously maintains stored information even when power is not supplied, and a volatile storage device that requires power to maintain the stored information. The memory 130 may perform a function of temporarily or permanently storing data processed by the processor 140. The memory 130 may include a magnetic storage medium or a flash storage medium in addition to a volatile storage device that requires power to maintain stored information, but the scope of the present disclosure is not limited thereto.

The processor 140 executes a body temperature measurement program stored in the memory 130. In addition, the processor 140 measures a body temperature of a target object within a video image by using the video image and a thermal image input to the communication module 110. In this case, a face temperature may be measured as the body temperature. The processor 140 may include various types of devices for controlling and processing data. The processor 140 may indicates a data processing device embedded in hardware and having a physically structured circuit to perform a function represented as codes or instructions included in a program. In one example, the processor 140 may include a microprocessor, a central processing unit (CPU), a processor core, a multiprocessor, an application-specific integrated circuit (ASIC), or a field programmable gate array (FPGA), but the scope of the present disclosure is not limited thereto.

The processor 140 executes a body temperature measurement program to perform the following functions. The body temperature measurement program may detect a face in a video image to set a face area. The face area may have a form having an x-axis coordinate and a y-axis coordinate. The body temperature measurement program may determine whether a mask is worn on the face in the video image. In this case, the body temperature measurement program may use a deep learning-based artificial intelligence model trained to extract feature information of a human face and a mask and identify the face and the mask within the video image. Facial feature information may include, for example, a size, a contour, and a shape of the face, and positions of eyes, a nose, and a mouth. The feature information of the mask may include a shape, a size, a position, and so on of the mask.

The body temperature measurement program may perform floating population estimation by individually setting a tracking ID to each of a plurality of faces when faces of a plurality of persons in the video image are recognized. In addition, the body temperature measurement program may also separately acquire a probability value that is determined to be a face in a video image by a deep learning-based artificial intelligence model.

As described above, the face recognition body temperature measuring apparatus 100 may identify a plurality of faces, classify each face, and measure a temperature of each face. In one example, a body temperature measurement program distinguishes and recognizes a plurality of faces included in a video image by using an artificial intelligence model trained to learn feature information on a human face and extract the human face from the video image.

The body temperature measurement program may set a temperature measurement area corresponding to a face area in the video image in a thermal image. More specifically, the body temperature measurement program may set a target area corresponding to the face area in the video image in the thermal image. The body temperature measurement program may set an upper portion among the upper portion and a lower portion of a target area divided according to a preset division ratio as the temperature measurement area. In this case, the body temperature measurement program may perform correction based on a difference between resolution of the video image and resolution of the thermal image such that the face area in the video image more accurately matches the target area of the thermal image. In addition, the body temperature measurement program may perform correction based on a difference between a curvature of a lens that acquires the video image and a curvature of a lens that acquires the thermal image such that the face area in the video image more accurately matches the target area of the thermal image.

In one example, when a person wears a mask on his/her face, a temperature of breath may be transferred to the mask to be set as a body temperature. In order to prevent this, a body temperature measurement program may measure a body temperature by setting 60% of an area from an uppermost ends of a face area and a target area to lower ends thereof as a temperature measurement area. In addition, in another example, when measuring a human body temperature from a distance, the body temperature measurement program may measure a body temperature by setting about 30% of an area from the uppermost ends of the face area and the target area to the lower ends thereof as the temperature measurement area because a temperature on a lacrimal gland side is most accurate. However, the scope of the present disclosure is not limited by the above examples.

The body temperature measurement program may calculate the greatest infrared intensity value $fpa_{face}$, which is the highest value among infrared intensity values in the temperature measurement area. In more detail, the body temperature measurement program may calculate an infrared intensity value of respective pixels included in the temperature measurement area and set the highest value among the infrared intensity values of the respective pixels as the greatest infrared intensity value. The infrared intensity values are variables used for measuring a body temperature and mean an infrared focal plane array (FPA).

The body temperature measurement program may calculate an infrared intensity value $fpa_{target}$ of a temperature measurement target by adding a first correction value calculated based on an infrared intensity value of a specific object that varies according to a measurement distance, a second correction value calculated based on an infrared intensity value of a specific object that varies according to an external temperature, and a third correction value calculated based on an infrared intensity value of a specific object that varies according to a change rate of the external temperature to the calculated greatest infrared intensity value. The specific object includes all objects having a specific temperature. For example, the first to third correction values may be calculated through a face of a specific person. Alternatively, the first to third correction values may be calculated through a black body maintaining a constant temperature. Here, the measurement distance may indicate a distance between the camera module 120 of the face recognition body temperature measuring apparatus 100 and a specific object whose temperature is to be measured. The external temperature may indicate a temperature at a position where the face recognition body temperature measuring apparatus 100 and a specific object are located. The change rate of the external temperature may indicate a temperature change rate at a position where the face recognition body temperature measuring apparatus 100 and a specific object are located.

The first to third correction values may be calculated by a body temperature measurement program and may be preset by the face recognition body temperature measuring apparatus 100. The first correction value indicates a distance correction value calculated based on size data for each distance of a face to be measured acquired by the face recognition body temperature measuring apparatus 100 and a preset distance compensation magnification. The second correction value indicates a temperature correction value calculated based on infrared intensity values previously measured by the face recognition body temperature measuring apparatus 100 for each temperature for an object having a specific temperature and placed at a specific distance. The third correction value indicates a temperature change rate correction value calculated based on a difference between temperature values previously measured by the face recognition body temperature measuring apparatus 100 according to a temperature change rate for an object having a specific temperature and placed at a specific distance. In order to calculate the first to third correction values, the face recognition body temperature measuring apparatus 100 may acquire video image data of the same human face for each preset imaging time interval (a frame interval), temperature data on an ambient temperature, data on a change rate of the ambient temperature, and so on.

The body temperature measurement program may calculate a distance correction value by using that an infrared intensity value of a measurement target is measured to be relatively high as a distance of the temperature measurement target is closer from the face recognition body temperature measuring apparatus 100. An example of a process in which the distance correction value is calculated by the body temperature measurement program is as follows. The body temperature measurement program sets a distance compensation magnification β of the infrared intensity value based on 1 m. When two-dimensional coordinates of the face area are x0, y0, x1, and y1, the body temperature measurement program estimates a face size, for example, the y axis of a target area in a thermal image by dividing a section by 0.5 m and sets an optimal distance to 1 m. The body temperature measurement program collects face size data from 0.5 m to 3 m in unit of 0.5 m and sets an average value thereof as a face size reference value. The body temperature measurement program calculates a measurement distance $\hat{d}$, not unit of 0.5 m, by using Equation (3) below which is a proportional equation of a face size and a distance. The body temperature measurement program calculates a final distance correction value $fpa_d$ by using Equation (4) below.

$$\hat{d} = \frac{d_1 - d_0}{y_1 - y_0} \times (y - y_0) \qquad \text{Equation (3)}$$

$$fpa_d = \beta \times (d - 1) \qquad \text{Equation (4)}$$

The body temperature measurement program may calculate a temperature correction value by using that an infrared intensity value of a temperature measurement target measured by the face recognition body temperature measuring apparatus 100 is reduced as a temperature rises. Here, the temperature may indicate a temperature around the face recognition body temperature measuring apparatus 100. An example of a process in which the temperature correction value is calculated by the body temperature measurement program is as follows. The body temperature measurement program collects infrared intensity values by using a black body (36.5° C.) placed at the same distance at different temperatures. The body temperature measurement program displays the collected data as representative values for every 1° C. In this case, a greatest value, a smallest value, an average, a median value, and a sampling error may be set as the representative values. The body temperature measurement program averages how much the measured infrared intensity value changes when the temperature changes by 1° C. When the body temperature measurement program measures the infrared intensity value on average, if a difference therebetween is large, a section may be divided. For example, the body temperature measurement program may use an experimental value in which a change in infrared intensity value per 1° C. is about 30 from 24° C. to 30° C. and increases to about 80 at 24° C. or less. Finally, the body temperature measurement program may calculate the temperature correction value $fpa_e$ by using Equation (5) below.

$$fpa_e = (C - C_0) \times \alpha \qquad \text{Equation (5)}$$

In Equation (5), α is a constant value that is set differently for each temperature change section. The body temperature measurement program may calculate a temperature change rate correction value by using that an error of a measured infrared intensity value increases when a temperature change rate sharply increases. An example of a process in which the temperature change rate correction value comp is calculated by the body temperature measurement program is as follows.

$$mot_t = \varepsilon \times (c_t - c_{t-1}) + (1 - \lambda) \times mot_{t-1} \qquad \text{Equation (6)}$$

$$comp = w_{mot} \times mot_t \qquad \text{Equation (7)}$$

In Equation (6) and Equation (7), $c_t$ represents a current temperature, $c_{t-1}$ represents a temperature before one frame acquired by the face recognition body temperature measuring apparatus 100, and ε, λ, and $w_{mot}$ indicate constants calculated by experiment.

Referring to Equation (6) and Equation (7), when there is little change in temperature, the temperature change rate correction value comp converges to 0. However, when a temperature changes rapidly, the temperature change speed correction value comp increases rapidly. In addition, when the temperature is continuously maintained at the rapidly changed temperature, the temperature change rate correction value comp converges to 0 again. In this way, the body temperature measurement program may accurately measure a body temperature even when there is a rapid change in temperature.

The body temperature measurement program may calculate a body temperature by using a difference between the infrared intensity value $fpa_{target}$ of a temperature measurement target and the infrared reference value autofpa preset by the face recognition body temperature measuring apparatus 100. For example, a body temperature may be estimated by comparing, with the temperature reference value, the difference between the infrared intensity value of the temperature measurement target and the infrared reference value preset by the face recognition body temperature measuring apparatus 100.

The infrared reference value is another variable for measuring a body temperature and may be preset by the face recognition body temperature measuring apparatus 100. An example of a method of setting the infrared reference value is as follows. First, the face recognition body temperature measuring apparatus 100 is turned on and waits for a predetermined time such that an internal temperature reaches a preset level. Next, a person with a face temperature of 36.5° C. waits for a preset time near the camera module 120 of the face recognition body temperature measuring apparatus 100. For example, a person with a face temperature of 36.5° C. waits for 5 seconds at a distance of 1 m from the camera module 120. next. data on environmental factors such as a current temperature and a distance, and data on infrared intensity values of a face are collected. Respective median values of the infrared intensity value, the current temperature, and the distance data of the face are respectively set as an infrared reference, a current temperature, and a measurement distance.

The body temperature measurement program may correct an infrared reference value autofpa according to time. The body temperature measurement program may correct the infrared reference value autofpa by updating some information of a dataset of temperatures from 36.2° C. to 36.8° C. measured within about 1.5 m as a normal person based on a face size. Based on Equation (8) below, the body temperature measurement program may correct variables affecting body temperature measurement in addition to a temperature and a distance.

$$autofpa_t = \mu \times autofpa_{t-1} + (1 - \mu) \times fpa_{target} \qquad \text{Expression (8)}$$

In Equation (8), μ is a constant calculated by experiment.

The infrared intensity value $fpa_{target}$ of a temperature measurement target calculated by calculation of a body temperature measurement program is a value obtained by adding the distance correction value $fpa_d$, the temperature correction value $fpa_e$, and the temperature change rate correction value comp to the greatest infrared intensity value $fpa_{face}$. Following is an example of a process in which a body temperature is calculated by the body temperature measurement program in relation to the temperature reference value described above. The body temperature measurement program sets a temperature reference value $\delta 36.5$. The body temperature measurement program may assume 30% of the temperature reference value as an error std_err as illustrated in Equation (9) below.

$$\text{Std\_err} = \delta_{36.5} \times 0.3 \quad \text{Equation (9)}$$

Because a body temperature measurement program measures a human temperature, the body temperature measurement program may measure a body temperature by adding reference points of 35° C., 35.5° C., 36° C., 37.5° C., and 38.5° C. in addition to the temperature reference value $\delta 36.5$ of 36.5° C. An equation used by the body temperature measurement program to measure a body temperature is as follows. In Equation (10) to Equation (16) below, temp corresponds to a temperature value of a temperature measurement target.

$$\text{if } (fpa_{target} - autofpa) <= abs(std\_err): \text{temp} = 36.5°\text{ C.} \quad \text{Equation (10)}$$

$$\text{elif } (fpa_{target} - autofpa) > std\_err \text{ and } (fpa_{target} - autofpa) < std\_err + \delta_{36.5}: \text{temp} = 36.5 + (fpa_{target} - autofpa - std\_err)/\delta_{36.5} \quad \text{Equation (11)}$$

$$\text{elif } (fpa_{target} - autofpa) >= std\_err + \delta_{36.5} \text{ and } (fpa_{target} - autofpa) < std\_err + \delta_{36.5} + \delta_{37.5}: \text{temp} = 37.5 + (fpa_{target} - autofpa - std\_err - \delta_{36.5})/\delta_{37.5} \quad \text{Equation (12)}$$

$$\text{elif } (fpa_{target} - autofpa) >= std\_err + \delta_{36.5} + \delta_{37.5} \text{ and } (fpa_{target} - autofpa) < std\_err + \delta_{36.5} + \delta_{37.5} + 838.5: \text{temp} = 38.5 + (fpa_{target} - autofpa - std\_err - \delta_{36.5} - \delta_{37.5})/\delta_{38.5} \quad \text{Equation (13)}$$

$$\text{elif } (fpa_{target} - autofpa) < -std\_err \text{ and } (fpa_{target} - autofpa) >= -std\_err - \delta_{36}/2: \text{temp} = 36.5 + (fpa_{target} - autofpa + std\_err)/\delta_{36} \quad \text{Equation (14)}$$

$$\text{elif } (fpa_{target} - autofpa) < -std\_err - \delta_{36}/2 \text{ and } (fpa_{target} - autofpa) >= -std\_err - \delta_{36}/2 - \delta_{35.5}/2: \text{temp} = 36 + (fpa_{target} - autofpa + std\_err + \delta_{36}/2)/\delta_{35.5} \quad \text{Equation (15)}$$

$$\text{else: temp} = 35.5 + (fpa_{target} - autofpa + std\_err + \delta_{36}/2 + \delta_{35.5}/2)/\delta_{35} \quad \text{Equation (16)}$$

Referring to Equation (10), when a value obtained by subtracting the infrared reference value autofpa from the infrared intensity value $fpa_{target}$ of a temperature measurement target is less than or equal to an absolute value of an error std_err, a body temperature measurement program may determine a temperature of a temperature measurement target as 36.5° C. Referring to Equation (11), when Equation (10) is not satisfied, the value obtained by subtracting the infrared reference value autofpa from the infrared intensity value $fpa_{target}$ of the temperature measurement target is greater than the error std_err, and when the value obtained is less than a value obtained by adding a 36.5° C. temperature reference value $\delta 36.5$ to the error std_err, the body temperature measurement program may determine that a temperature of the temperature measurement target is a value obtained by adding 36.5° C. to a value obtained by dividing a value obtained by subtracting the infrared reference value autofpa and the error std_err from the infrared intensity value $fpa_{target}$ of the temperature measurement target by the 36.5° C. temperature reference value $\delta 36.5$.

Equation (12) to Equation (15) are also similar to Equation (11), and a body temperature measurement program may calculate a temperature value of a temperature measurement target with reference to Equation (12) to Equation (15). Referring to Equation (16), when Equation (10) to Equation (15) are not satisfied, the temperature value of the temperature measurement target may be set to a value obtained by subtracting the infrared reference value autofpa from the infrared intensity value $fpa_{target}$ of a temperature measurement target, adding the error std_err thereto, adding half of the 36° C. temperature reference value $\delta 36$ thereto, and adding 35.5 to a value obtained by dividing a value obtained by adding half of the 35.5° C. temperature reference value $\delta 35.5$ thereto by the 35° C. temperature reference value $\delta 35$.

Figure 2:
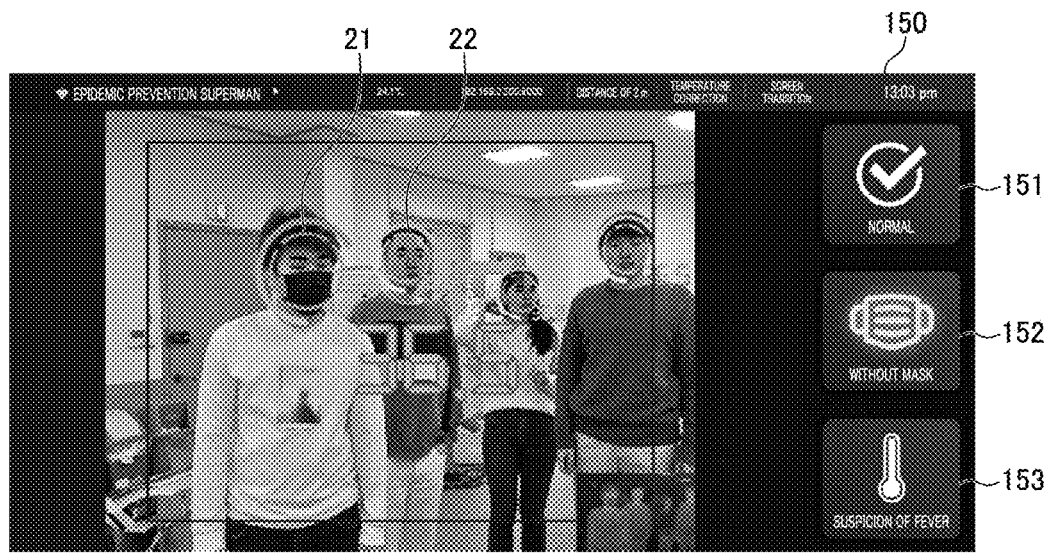
FIGS. 2 to 5 are views illustrating examples of body temperature measurement using the face recognition body temperature measuring apparatus illustrated in FIG. 1.

Referring to FIG. 2, the face recognition body temperature measuring apparatus 100 may further include a separate display 150 displaying a video image. The face recognition body temperature measuring apparatus 100 may distinguish and recognize a plurality of faces 21 and 22 included in the video image displayed on the display 150. The display 150 may include a first interface 151 that determines whether a body temperature of a person in the video image is normal, a second interface 152 that determines whether a mask is worn on a face of a person in the video image, and a third interface 153 indicating whether there is a person with a fever-suspected symptom. Each of the first to third interfaces 151, 152, and 153 may display information through a color change or and so on. In addition, although not illustrated in the drawings, the face recognition body temperature measuring apparatus 100 may further include a separate output device (not illustrated) for outputting information indicated by the first to third interfaces 151, 152, and 153 as a voice.

Figure 3:

Referring to FIG. 3, the face recognition body temperature measuring apparatus 100 may measure a temperature of a face 31 included in a video image displayed on the display 150 and determine that a face with the measured temperature of 36.5° C. is normal and display the determination result in first interface 151. In addition, the face recognition body temperature measuring apparatus 100 may determine that the face 31 included in the video image displayed on the display 150 is wearing a mask and may display the determination result in the second interface 152.

Figure 4:

Referring to FIG. 4, the face recognition body temperature measuring apparatus 100 may measure a temperature of a face 41 included in a video image displayed on the display 150 and determine that a face with the measured temperature of 37.2° C. is abnormal and display the determination result in the first interface 151. In addition, the face recognition body temperature measuring apparatus 100 may determine that the face 41 included in the video image displayed on the display 150 is not wearing a mask and display the determination result in the second interface 152. In this case, the face recognition body temperature measuring apparatus 100 may classify the person included in the video image displayed on the display 150 as a fever-suspected person and display the classification result in the third interface 153.

Figure 5:

Referring to FIG. 5, the display 150 may display a thermal image acquired by the face recognition body temperature measuring apparatus 100. Similar to a case of the video image described above with reference to FIG. 2, the face recognition body temperature measuring apparatus 100 may distinguish and recognize a plurality of faces 51 and 52 included in the thermal image displayed on the display 150.

Figure 6:
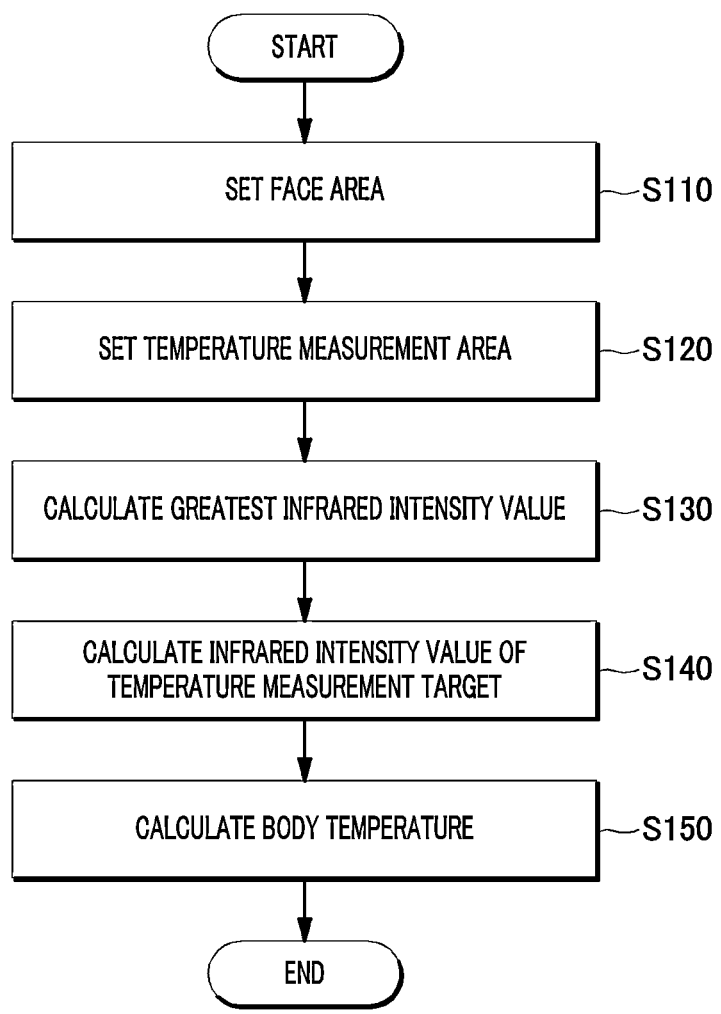
FIG. 6 is a flowchart illustrating a sequence of a face recognition body temperature measuring method according to another embodiment of the present disclosure.
Figure 7:
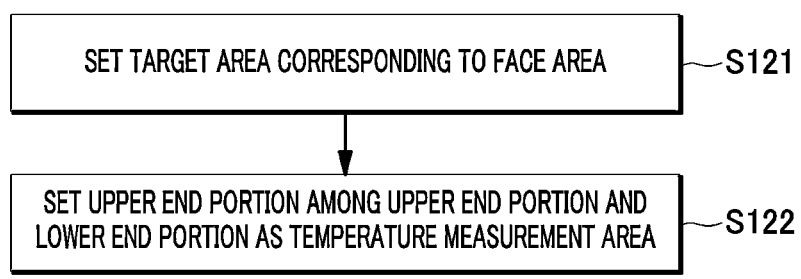
FIGS. 7 and 8 are flowcharts illustrating detailed processes for some steps of the face recognition body temperature measuring method illustrated in FIG. 6.
Figure 8:
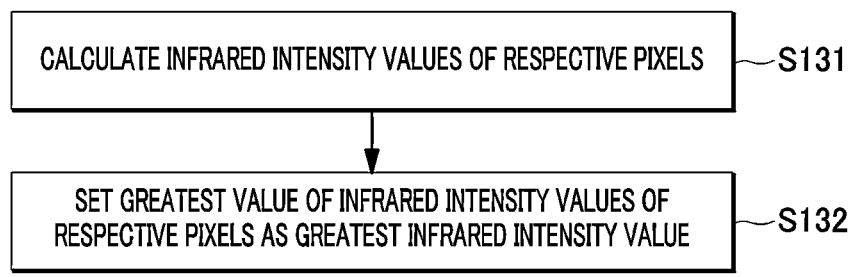

FIG. 6 is a flowchart illustrating a sequence of a method of measuring a face recognition body temperature (hereinafter, referred to as a "face recognition body temperature measuring method") according to another embodiment of the present disclosure, and FIGS. 7 and 8 are flowcharts illustrating detailed processes for some steps of the face recognition body temperature measuring method illustrated in FIG. 6. Hereinafter, the face recognition body temperature measuring method will be described in detail with reference to FIGS. 6 to 8.

The face recognition body temperature measuring method is performed by the face recognition body temperature measuring apparatus 100 described above with reference to FIGS. 1 to 5. For example, respective steps and detailed process of the face recognition body temperature measuring method to be described below may be implemented by the body temperature measurement program described above and may be performed by the processor 140 illustrated in FIG. 1. therefore, description of the face recognition body temperature measuring apparatus 100 of FIG. 1 described above with reference to FIGS. 1 to 5 may be equally applied to the face recognition body temperature measuring method to be described below.

As illustrated in FIG. 6, the face recognition body temperature measuring method may include a face area setting step S110, a temperature measurement area setting step S120, a greatest infrared intensity value calculation step S130, a temperature measurement target infrared intensity value calculation step S140, and a body temperature calculation step S150.

The face area setting step S110 is a step of setting a face area by detecting a face in a video image among the video image and a thermal image obtained by simultaneously imaging a target object.

The temperature measurement area setting step S120 is a step of setting a temperature measurement area corresponding to a face area of the video image in the thermal image.

The greatest infrared intensity value calculation step S130 is a step of calculating a greatest infrared intensity value which is the greatest value among infrared intensity values in the temperature measurement area.

The temperature measurement target infrared intensity value calculation step S140 is a step of calculating an infrared intensity value of a temperature measurement target obtained by adding first to third correction values to the greatest infrared intensity value. The first correction value is calculated based on a preset distance compensation magnification and a distance-specific size data of a face previously obtained by a face recognition body temperature measuring apparatus. The second correction value is calculated based on a difference between infrared intensity values previously measured for each temperature by the face recognition body temperature measuring apparatus with respect to an object having a specific temperature and placed at a specific distance. The third correction value is calculated based on a temperature value previously measured by the face recognition body temperature measuring apparatus according to a temperature change rate with respect to an object having a specific temperature and placed at a specific distance. The first to third correction values may be calculated by the same methods as the methods of obtaining the distance correction value $fpa_d$, the temperature correction value $fpa_e$, and the temperature change rate correction value comp, which are described above with reference to FIG. 1.

The body temperature calculation step S150 is a step of calculating a body temperature of a target object by using a difference between the infrared intensity value of the temperature measurement target and an infrared reference value preset by the face recognition body temperature measuring apparatus.

The face recognition body temperature measuring method may further include a step of acquiring the video image and the thermal image obtained by simultaneously imaging the target object by using a camera module included in the face recognition body temperature measuring apparatus before the face area setting step S110 is performed.

In one example, the video image includes a plurality of faces of a plurality of target objects, and the face area setting step S110 may further include a step of distinguishing and recognizing the plurality of faces included in the video image by using an artificial intelligence model that is trained to extract a human face from the video image by learning feature information on the human face.

As illustrated in FIG. 7, the temperature measurement area setting step S120 may include a step S121 of setting a target area corresponding to a face area of the video image in the thermal image and a step S122 of setting an upper end portion, as a temperature measurement area, among the upper end portion and a lower end portion of a target area distinguished according to a preset division ratio.

As illustrated in FIG. 8, the greatest infrared intensity value calculation step S130 may include a step S131 of calculating infrared intensity values of pixels included in the temperature measurement area and a step S132 of setting the greatest value of the infrared intensity values of the pixels as the greatest infrared intensity value.

The face recognition body temperature measuring method described above may also be implemented in the form of a recording medium including instructions executable by a computer such as a program module executed by a computer. Computer-readable media may be any available media that may be accessed by a computer and includes both volatile and nonvolatile media, and removable and non-removable media. In addition, the computer-readable media may include both computer storage media and communication media. The computer storage media includes all of volatile and nonvolatile, and removable and non-removable media implemented by any method or technology for storing information such as computer readable instructions, data structures, program modules, or other data.

Those skilled in the art to which the present disclosure pertains will be able to understand that the embodiments of the present disclosure may be easily modified into other specific forms without changing the technical idea or essential features of the present disclosure based on the above description. Therefore, it should be understood that the embodiments described above are illustrative in all respects and not restrictive. The scope of the present disclosure is indicated by the following claims, and all changes or modifications derived from the meaning and scope of the claims and their equivalents should be construed as being included in the scope of the present disclosure.

According to the present disclosure, even when there is another heat source as well as a face of a person in a video image, temperatures of individual heat sources may be measured, body temperatures of a plurality of persons may be measured, and a temperature of a heat source with large infrared intensity may not be measured.

In addition, according to the present application, a distance correction value related to a measured temperature may be calculated based on intensity of infrared rays that change according to a distance, and an error caused by a change in measured distance to a person may be corrected by using the distance correction value.

In addition, according to the present application, a temperature correction value related to a measured temperature may be calculated based on a change in infrared intensity of a face according to a temperature, and an error caused by a change in temperature of a person may be corrected by using the temperature correction value.

In addition, according to the present application, a climate change rate correction value may be calculated based on a change in temperature measurement value according to a temperature change rate, and an error of a measured temperature caused by a temperature change rate may be corrected by using the climate change rate correction value.

What is claimed is:

1. A face recognition body temperature measuring apparatus comprising:
    a communication module configured to receive a video image and a thermal image obtained by simultaneously imaging at least one target object from a camera module;
    a memory configured to store a body temperature measurement program for measuring a body temperature by using the video image and the thermal image; and
    a processor configured to execute the body temperature measurement program stored in the memory,
    wherein the processor sets a face area by detecting a face of the target object in the video image, sets, in the thermal image, a temperature measurement area corresponding to the face area in the video image, calculates a greatest infrared intensity value which is a greatest value of infrared intensity values in the temperature measurement area, calculates an infrared intensity value of a temperature measurement target by adding, to the greatest infrared intensity value, a first correction value calculated based on infrared intensity values of a specific object that varies according to a measurement distance, a second correction value calculated based on infrared intensity values of a specific object that varies according to an external temperature, and a third correction value calculated based on infrared intensity values of a specific object that varies according to a change rate of the external temperature, and calculates a body temperature of the at least target object by using a difference between the infrared intensity value of the temperature measurement target and an infrared reference value preset by the face recognition body temperature measuring apparatus.

2. The face recognition body temperature measuring apparatus of claim 1, further comprising:
    a camera module configured to acquire the video image and the thermal image by including an image sensor and an infrared sensor.

3. The face recognition body temperature measuring apparatus of claim 1, wherein
    the video image includes a plurality of faces of the at least one target object, and
    the processor distinguishes and recognizes the plurality of faces included in the video image by using an artificial intelligence model trained to learn feature information on a human face and extract the human face from the video image.

4. The face recognition body temperature measuring apparatus of claim 1, wherein the processor sets, in the thermal image, a target area corresponding to the face area in the video image and sets an upper end portion, as a temperature measurement area, among the upper end portion and a lower end portion of the target area distinguished according to a preset division ratio.

5. The face recognition body temperature measuring apparatus of claim 1, wherein the processor calculates infrared intensity values of pixels included in the temperature measurement area and sets a greatest value of the infrared intensity values of the pixels as a greatest infrared intensity value.

6. The face recognition body temperature measuring apparatus of claim 1, wherein the first correction value is calculated based on size data for each distance of the face previously acquired by the face recognition body temperature measuring apparatus and a preset distance compensation magnification.

7. The face recognition body temperature measuring apparatus of claim 1, wherein the second correction value is calculated based on a difference between infrared intensity values previously measured by the face recognition body temperature measuring apparatus for each temperature for an object having a specific temperature and placed at a specific distance.

8. The face recognition body temperature measuring apparatus of claim 1, wherein the third correction value is calculated based on a difference between temperature values previously measured by the face recognition body temperature measuring apparatus according to a temperature change rate for an object having a specific temperature and placed at a specific distance.

9. A face recognition body temperature measuring method performed by a face recognition body temperature measuring apparatus, the face recognition body temperature measuring method comprising:
    setting a face area by detecting a face in a video image among the video image and a thermal image obtained by simultaneously imaging at least one target object;
    setting, in the thermal image, a temperature measurement area corresponding to the face area in the video image;
    calculating a greatest infrared intensity value which is a greatest value of infrared intensity values in the temperature measurement area;
    calculating an infrared intensity value of a temperature measurement target by adding, to the greatest infrared intensity value, a first correction value calculated based on infrared intensity values of a specific object that varies according to a measurement distance, a second correction value calculated based on infrared intensity values of a specific object that varies according to an external temperature, and a third correction value calculated based on infrared intensity values of a specific object that varies according to a change rate of the external temperature; and
    calculating a body temperature of the at least target object by using a difference between the infrared intensity value of the temperature measurement target and an infrared reference value preset by the face recognition body temperature measuring apparatus.

10. The face recognition body temperature measuring method of claim 9, further comprising:
    acquiring the video image and the thermal image obtained by simultaneously imaging the target object by using a camera module included in the face recognition body temperature measuring apparatus before the setting of the face area.

11. The face recognition body temperature measuring method of claim 9, wherein
    the video image includes a plurality of faces of the at least one target object, and
    the setting of the face area further includes distinguishing and recognizing the plurality of faces included in the video image by using an artificial intelligence model trained to learn feature information on a human face and extract the human face from the video image.

12. The face recognition body temperature measuring method of claim 9, wherein the setting of the face area comprises:
    setting, in the thermal image, a target area corresponding to the face area in the video image; and setting an upper end portion, as a temperature measurement area, among the upper end portion and a lower end portion of the target area distinguished according to a preset division ratio.

13. The face recognition body temperature measuring method of claim 9, wherein the calculating of the greatest infrared intensity value comprises:
    calculating infrared intensity values of pixels included in the temperature measurement area; and
    setting a greatest value of the infrared intensity values of the pixels as a greatest infrared intensity value.

14. The face recognition body temperature measuring method of claim 9, wherein the first correction value is calculated based on size data for each distance of the face previously acquired by the face recognition body temperature measuring apparatus and a preset distance compensation magnification.

15. The face recognition body temperature measuring method of claim 9, wherein the second correction value is calculated based on a difference between infrared intensity values previously measured by the face recognition body temperature measuring apparatus for each temperature for an object having a specific temperature and placed at a specific distance.

16. The face recognition body temperature measuring method of claim 9, wherein the third correction value is calculated based on a difference between temperature values previously measured by the face recognition body temperature measuring apparatus according to a temperature change rate for an object having a specific temperature and placed at a specific distance.

17. A non-transitory computer-readable recording medium comprising:
    a computer program configured to perform the face recognition body temperature measuring method of claim 9.

* * * * *